United States Patent
Deffley et al.

(10) Patent No.: US 12,248,509 B2
(45) Date of Patent: Mar. 11, 2025

(54) AI-POWERED RAW FILE MANAGEMENT

(71) Applicant: AWES.ME, INC., Mountain View, CA (US)

(72) Inventors: Evan Christopher Deffley, Scotts Valley, CA (US); Nathan Cosmo Rahn, Fremont, CA (US); Bobby Yang, San Jose, CA (US); Kaserin Tammie Kong-Santos, Mountain View, CA (US); Don MacAskill, Los Altos, CA (US); Brian Fenton, Mountain View, CA (US); David Parry, Mountain View, CA (US); Mikkel Wilson, Mountain View, CA (US); Kevin Boyd, Mountain View, CA (US); Lee Shepherd, Mountain View, CA (US); Andres Ruiz, Mountain View, CA (US); Erik Giberti, Mountain View, CA (US); Ivy Tsai, Mountain View, CA (US)

(73) Assignee: AWES.ME, INC., Mountain View, CA (US)

( * ) Notice: Subject to any disclaimer, the term of this patent is extended or adjusted under 35 U.S.C. 154(b) by 5 days.

(21) Appl. No.: 18/075,371

(22) Filed: Dec. 5, 2022

(65) Prior Publication Data

US 2023/0205812 A1   Jun. 29, 2023

Related U.S. Application Data

(60) Provisional application No. 63/285,809, filed on Dec. 3, 2021.

(51) Int. Cl.
G06F 17/30 (2006.01)
G06F 16/53 (2019.01)
(Continued)

(52) U.S. Cl.
CPC .............. *G06F 16/55* (2019.01); *G06F 16/53* (2019.01); *G06F 16/54* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,806,331 B2 * 8/2014 Grosz .................... G06F 16/51
715/251
8,868,506 B1 * 10/2014 Bhargava .............. G06F 16/219
707/648

(Continued)

FOREIGN PATENT DOCUMENTS

AU    2022402119    5/2024
CA    3240951       6/2023

(Continued)

OTHER PUBLICATIONS

PCT Application No. PCT/US2022/051874, International Search Report and Written Opinion dated Mar. 27, 2023.

(Continued)

*Primary Examiner* — Hung D Le
(74) *Attorney, Agent, or Firm* — Polsinelli LLP (57) ABSTRACT

A system and method for managing raw files are disclosed. A plurality of image files associated with one or more raw files that include respective metadata are evaluated. A set of one or more of the images files are grouped together based on matching the respective metadata. An asset file corresponding to the raw file and the grouped set of the image files are generated. The asset file are retrieved in response to a request from a user device. At least one of the image files in the grouped set are selected and a display of the selected image file is generated for rendering.

23 Claims, 5 Drawing Sheets

(51) Int. Cl.
  *G06F 16/54* (2019.01)
  *G06F 16/55* (2019.01)

(56) References Cited

U.S. PATENT DOCUMENTS

| | | | |
|---|---|---|---|
| 9,219,830 B1* | 12/2015 | Ciorba | H04N 1/00177 |
| 9,626,381 B2* | 4/2017 | De Armas | G06F 40/169 |
| 10,685,460 B2* | 6/2020 | Porecki | G06T 11/60 |
| 10,719,492 B1 | 7/2020 | Edell | |
| 10,820,293 B2* | 10/2020 | Frieder | H04N 21/454 |
| 10,880,252 B2* | 12/2020 | Gauglitz | H04W 4/022 |
| 10,942,635 B1* | 3/2021 | Rakshit | G06F 3/0482 |
| 11,455,330 B1* | 9/2022 | Bernstein | G06F 16/9536 |
| 11,869,053 B2* | 1/2024 | Teo | G06Q 30/0601 |
| 2010/0171805 A1* | 7/2010 | Ron | H04M 3/44 348/14.02 |
| 2010/0293105 A1* | 11/2010 | Blinn | H04L 51/52 715/733 |
| 2012/0266066 A1* | 10/2012 | Liao | G06F 3/0481 715/748 |
| 2013/0311947 A1* | 11/2013 | Tsai | G06Q 10/101 715/815 |
| 2014/0003648 A1* | 1/2014 | Fedorovskaya | G06Q 50/01 382/100 |
| 2014/0040712 A1 | 2/2014 | Chang et al. | |
| 2014/0086458 A1* | 3/2014 | Rogers | H04L 65/60 709/204 |
| 2014/0096041 A1* | 4/2014 | Gowen | G06Q 30/0621 715/753 |
| 2015/0020086 A1* | 1/2015 | Chen | H04H 60/46 725/12 |
| 2016/0117344 A1* | 4/2016 | Kleinpeter | H04L 51/043 707/748 |
| 2016/0125062 A1* | 5/2016 | Karlsson | G06F 16/58 707/737 |
| 2016/0140934 A1* | 5/2016 | Frieder | G11B 27/34 345/156 |
| 2016/0179302 A1* | 6/2016 | Strong | G06F 3/0482 715/811 |
| 2016/0239188 A1* | 8/2016 | Strong | G06F 3/0488 |
| 2016/0239519 A1* | 8/2016 | Levy | G06F 16/5838 |
| 2016/0255162 A1* | 9/2016 | Frieder | G06F 3/14 709/204 |
| 2016/0283743 A1* | 9/2016 | Rueger | G06F 21/6254 |
| 2016/0295064 A1* | 10/2016 | Li | H04N 19/137 |
| 2016/0323219 A1* | 11/2016 | Brecx | G06Q 50/01 |
| 2016/0358634 A1* | 12/2016 | Molgaard | H04N 23/73 |
| 2017/0039264 A1* | 2/2017 | Brewington | G06F 16/285 |
| 2017/0111694 A1* | 4/2017 | Marsh | H04L 12/6418 |
| 2017/0154065 A1* | 6/2017 | Raghavan | G06F 3/0482 |
| 2017/0192651 A1* | 7/2017 | Yang | G06F 3/04845 |
| 2017/0221095 A1* | 8/2017 | Gauglitz | G06Q 50/01 |
| 2017/0300782 A1* | 10/2017 | Cai | G06F 16/5866 |
| 2018/0052869 A1* | 2/2018 | McElmurray | G06F 16/583 |
| 2018/0077344 A1* | 3/2018 | Bostick | H04N 23/611 |
| 2018/0107660 A1* | 4/2018 | Wang | G06F 16/5854 |
| 2018/0146447 A1* | 5/2018 | Frieder | H04W 64/00 |
| 2018/0150986 A1* | 5/2018 | Frieder | G06F 3/147 |
| 2018/0349367 A1* | 12/2018 | Soni | G06F 16/93 |
| 2019/0050403 A1* | 2/2019 | Frieder | G06V 40/174 |
| 2019/0066178 A1* | 2/2019 | Sabbah | G06N 20/00 |
| 2019/0139285 A1* | 5/2019 | Chan | G06T 11/60 |
| 2019/0147620 A1* | 5/2019 | Pinel | G06V 20/00 382/159 |
| 2019/0155382 A1* | 5/2019 | Ikuta | G09G 5/00 |
| 2019/0188852 A1* | 6/2019 | Reicher | G06T 7/0014 |
| 2019/0250795 A1* | 8/2019 | Weldemariam | G06F 3/0483 |
| 2019/0327413 A1* | 10/2019 | Lorenzo | G06T 17/05 |
| 2019/0333220 A1* | 10/2019 | DeLuca | G06T 7/90 |
| 2019/0340305 A1* | 11/2019 | Amir | G06T 11/60 |
| 2019/0362192 A1* | 11/2019 | Steiner | G06F 18/24 |
| 2020/0082481 A1* | 3/2020 | James | G06F 18/24 |
| 2020/0089702 A1* | 3/2020 | Chapps | G06F 9/4451 |
| 2020/0105059 A1* | 4/2020 | Lukác | G06F 3/048 |
| 2020/0128145 A1* | 4/2020 | Strong | G06T 11/60 |
| 2020/0151429 A1* | 5/2020 | Xu | G06F 21/32 |
| 2020/0151937 A1* | 5/2020 | Miller | G06T 19/00 |
| 2020/0159937 A1* | 5/2020 | Schondorf | G06F 21/554 |
| 2020/0167401 A1* | 5/2020 | Hsieh | G06N 20/00 |
| 2020/0374452 A1* | 11/2020 | Rakshit | H04N 23/62 |
| 2021/0065706 A1* | 3/2021 | Hu | G06V 40/172 |
| 2021/0072869 A1* | 3/2021 | Spiry | G06F 3/04817 |
| 2021/0073269 A1* | 3/2021 | Spiry | G06N 20/00 |
| 2021/0075754 A1* | 3/2021 | Spiry | G06F 18/23 |
| 2021/0241019 A1 | 8/2021 | MacNeil et al. | |
| 2022/0083619 A1* | 3/2022 | Saini | H04N 1/00183 |
| 2022/0086337 A1* | 3/2022 | Subramanian | G06N 7/01 |
| 2022/0164935 A1* | 5/2022 | Girshick | G06T 5/50 |
| 2022/0171654 A1* | 6/2022 | Jones | G06F 16/1767 |
| 2022/0171744 A1* | 6/2022 | Jones | G06F 16/1873 |
| 2022/0171745 A1* | 6/2022 | Jones | G06F 16/93 |
| 2022/0171801 A1* | 6/2022 | Frieder | G06V 40/172 |
| 2022/0232162 A1* | 7/2022 | Gupta | H04N 23/633 |
| 2022/0277104 A1* | 9/2022 | Dahan | G06F 3/0488 |
| 2022/0343684 A1* | 10/2022 | Gardner | G06Q 10/1093 |
| 2022/0353584 A1* | 11/2022 | Chandrashekar | H04N 21/4394 |
| 2022/0366450 A1* | 11/2022 | Kleinpeter | G06F 16/1748 |
| 2022/0382803 A1* | 12/2022 | Kalu | G06F 16/55 |
| 2023/0071446 A1* | 3/2023 | Narayana | G06F 3/04815 |
| 2023/0205803 A1* | 6/2023 | Frieder | G06V 40/172 709/204 |

FOREIGN PATENT DOCUMENTS

| | | |
|---|---|---|
| CN | 118511169 A | 8/2024 |
| EP | 4441626 | 10/2024 |
| IN | 202447050126 | 7/2024 |
| JP | 2024-533232 | 6/2024 |
| KR | 10-2024-7018558 | 6/2024 |
| NZ | 811615 | 5/2024 |
| WO | PCT/US22/51874 | 12/2022 |
| WO | WO 2023/102271 | 6/2023 |

OTHER PUBLICATIONS

PCT Application No. PCT/US2022/051874, International Preliminary Report on Patentability dated Jun. 13, 2024.

* cited by examiner

AI-POWERED RAW FILE MANAGEMENT

CROSS-REFERENCE TO RELATED APPLICATION

The present application claims the priority benefit of U.S. provisional application No. 63/285,809 filed Dec. 3, 2021, the disclosures of which are incorporated herein by reference.

BACKGROUND OF THE INVENTION

1. Field of the Disclosure

The present disclosure is generally related to digital file management. Specifically, the disclosure is related to automated management of image files.

2. Description of the Related Art

Amateur and professional photographers may capture as many as hundreds, if not thousands of photographs in a single photography project. Presently available cameras and storage media technologies allow photographers to capture multiple exposures, angles, and various other composition variables during a shoot. Presently available hardware (e.g., desktop, laptop, and mobile computing devices) and software may be used to store, organize, and edit photographs from one or more photography sessions.

A photograph from a digital camera may be saved as a raw image file, which is an unedited and uncompressed data file encompassing the full set of details captured in relation to the photograph. The raw image file—which may include such formats such as a .RAW, .DNG, .RAF, .TIF, and other similar formats—may often be very large in resolution and file size. While a compressed image file (e.g., a .jpeg or .png file) may be rendered on most computing device displays using standard image viewing software (e.g., such as those associated with web browsers), such standard image viewing software are not compatible with raw image files, which require specialized software to render for display. The inability to render a raw image file may complicate or make more difficult the process of organizing and managing raw image files, which may further be exacerbated when there are numerous raw image files to manage and numerous different software applications for performing different functions upon the raw image files. Thus, managing raw images files can be a time-consuming, fragmented process.

In addition, the user may create multiple versions of any single raw image file in order to evaluate different combinations of edits, which may exponentially increase the number of images and files associated with a photography project. The different versions may further be stored using different photo editing applications or services, as well as presented to clients or buyers using different photo storage and secure access services. Different files of the different versions may therefore end up distributed across different services or storage locations. For example, the photographer may upload images to one or more digital storage and file sharing services that allow the buyer to review photographs online, as well as to request additional editing or changes to a photograph or select prints for purchase. In such cases, the photographer may need to locate and retrieve the associated raw image file(s) or edited versions thereof for further editing or printing, as well as upload the final edited images to the file sharing service for storage, access, and display to the user in a viewable format. Maintaining the integrity of version associations throughout can be extremely cumbersome and time-consuming for the user.

Therefore, there is a need in the art to provide improved systems and methods for automated raw file management.

DETAILED DESCRIPTION

Systems and methods for automatically associating digital files are disclosed. A file association service may receive various raw image files, rendered image files, and associated sidecar files in a variety of digital file formats. The file association service may extract metadata from each of the digital files and may link or associate one or more digital files with a different digital file based on extracted metadata. Digital files with detected similarities in metadata may be associated by an asset file. A user may manually associate files in cases where metadata from one or more files does not match. The asset file may include common metadata for each included digital file and links to each raw, rendered, or sidecar file. The asset file, raw files, rendered files, and sidecar files may be stored on a database of the file association service, and each file may further be accessed by a user via a user device.

Figure 1:
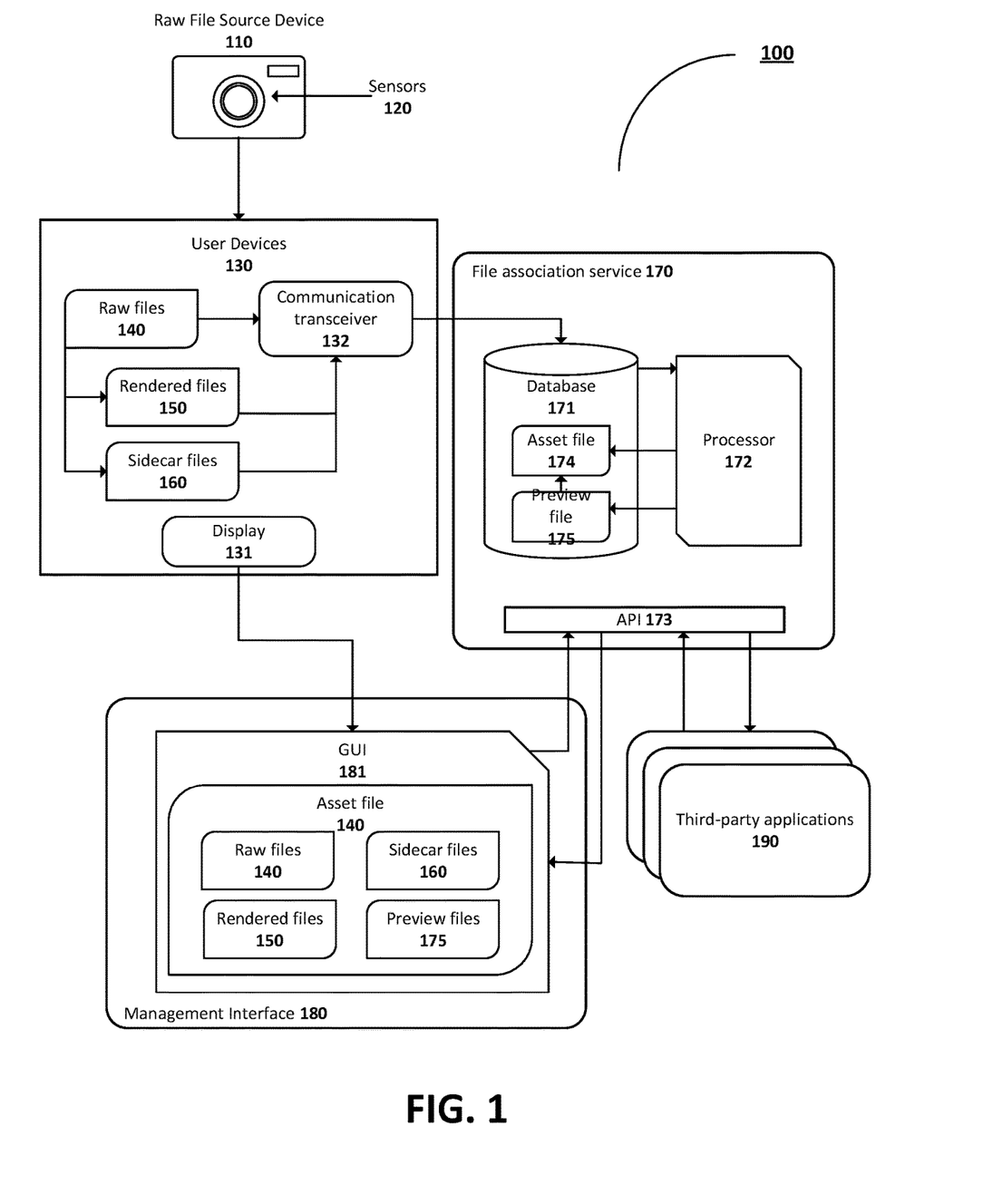
FIG. 1 illustrates an exemplary network environment.

FIG. 1 illustrates an exemplary network environment in which a system for automated association of digital files may be implemented. A raw image file, hereinafter referred to as a "raw file," 140 may be created and stored by a raw file source device 110, such as a digital camera or smartphone. The raw file source device 110 may include a variety of sensors 120 capable of creating metadata for the raw file 140 during image capture, including a geolocation, a date and time, a make and model of the raw image device, and imaging parameters known by the raw image device used during capture (e.g. focal length, aperture, exposure time, ISO, etc.). The raw file 140 and captured metadata may be transmitted to a user device 130, such as a desktop or laptop computer, tablet, or mobile device. In some embodiments, the user device 130 may act as the raw file source device 110, such as a smartphone capable of capturing raw files.

The user device 130 may include a plurality of different types of computing devices. For example, the user device 130 may include any number of different mobile devices, laptops, and desktops. In another example, the user device 130 may be implemented in the cloud. Such user device 130 may also be configured to access data from other storage media, such as, but not limited to memory cards or disk drives as may be appropriate in the case of downloaded or sensor captured data. Such devices 130 may include standard hardware computing components such as, but not limited to network and media interfaces, non-transitory computer-readable storage (memory), and processors for executing instructions that may be stored in memory. The user devices 130 may include various hardware sensors for detecting user interactions, such as a camera, microphone, and haptic feedback input mechanisms. Hardware sensors in user devices may be used to capture user response and feedback, such as gestures, speech, and touch. These user devices 130 may also run using a variety of different operating systems, such as iOS or Android. The user devices 130 may also run a variety of applications or computing languages, such as C++ or JavaScript. The user device may include one or more devices associated with a user or a user device capable of displaying on one or more screens.

Raw files 140 stored on the user device 130 may be digitally processed by software, such as Adobe® Lightroom or Capture One, that generates a rendered file 150, such as a .jpeg or .png file. Raw file editing software may generate a sidecar file 160 during editing of the raw file 140 or during compression and storage of the rendered file 150 (e.g. an .xmp file from Adobe Lightroom, or a .cof file from Capture One). Sidecar files 160 may include a history of the editing process of a raw file, may further be edited by the user, and may be used to generate multiple rendered files 150. Raw files 140, rendered files 150, and sidecar files 160 may be stored and accessed separately on the user device 130.

The user device 130 may transmit raw files 140, rendered files 150, and sidecar files 160 to a file association service 170 via a communication transceiver 132 over a communication network, such as a wide-area network (WAN) or internet connection. A file association service 170 may receive a transfer of files through various manual and automated methods initiated at the user device 130. Each file received by the file association service 170 may be stored in a database 171 of the file association service 170. The file association service 170 may include the database 171 and a processor 172. The processor 172 may execute instructions stored in database 171 to associate raw files 140, rendered files 150, and sidecar files 160 previously received and stored in the database 171. The file association may be saved in database 171 as an asset file 174. Capture metadata from the raw file source device 110, file metadata of each associated file, and metadata for the combined asset file 174 may be maintained as separate sections of metadata and stored within the asset file 174. The file association service 170 may extract capture metadata and file metadata from the transferred files, such as the filename, date captured, time of day, and imaging parameters captured by the source device (e.g. focal length, aperture, exposure time, ISO, etc.). Extracted metadata and links to each raw file 140, rendered file 150, and sidecar file 160 may be included in the metadata of the asset file 174. The processor 172 may further execute instructions to generate a preview file 175 for raw files 140. Preview files, such as a compressed .jpg version of a raw file 140, may be stored in the database 171 as part of the asset file 174.

A management interface 180 may communicate with database 171 of the file association service 170 via an application programming interface (API) 173 based on a request from a user device 130. The API 173 may act as an intermediary that allows one or more services of one or more software applications to communicate in a standardized request-response format. The API 173 may require a security authorization to accept or send data to a service or software application, such as an access key that must be encoded and passed within each request. The API 173 and may reject a request that fails to include the security authorization. Encoded requests from connected services or applications may include a payload containing the security authorization and instructions for the API to execute the request, such as retrieving data from the database 171, storing new data in the database 171, or triggering instructions executed by processor 172 performing other functions of the file association service 170. The management interface 180 may receive a user input via a graphical user interface (GUI) 181 displayed on the display 131 of the user device 130 and may execute one or more commands triggering an encoded request sent to the file association service 170 via the API 173. The GUI 181 of the management interface 180 may include commands to perform various functions related to raw files 140, rendered files 150, sidecar files 160, preview files 175, and asset files 174, such as creating a gallery of files, searching files, overwriting or updating file associations, and viewing a display of transferred files.

The API 173 of the file association service 170 may be configured to accept requests encoded by third-party applications 190 in addition to requests from the management interface 180. While illustrated as a separate entity in FIG. 1, third-party applications 190 may be a software installed on computer-readable storage media of user devices 130, or software accessed from an application cloud server via user devices 130. In some embodiments, third-party applications 190 may automatically transmit requests to the API 173 through various workflows configured by a user, such as automatically uploading sidecar files 160 from an editing application.

Figure 2:
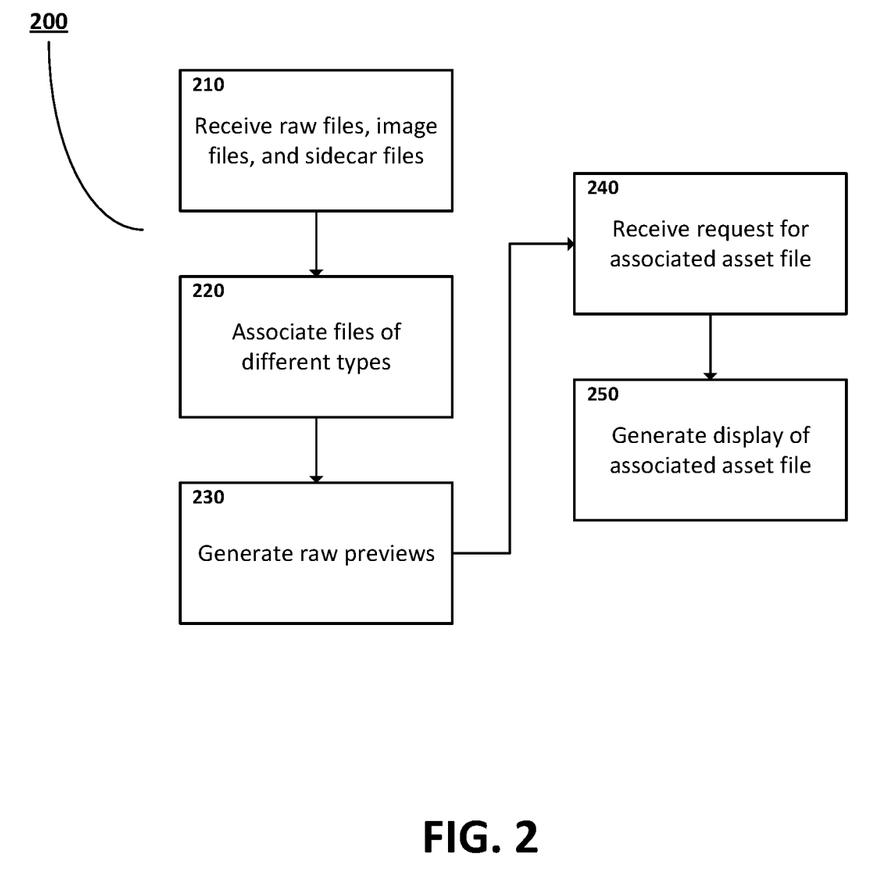
FIG. 2 is a flowchart illustrating an exemplary method for associating digital files.

FIG. 2 is a flowchart illustrating an exemplary method for associating digital files. The steps identified in FIG. 2 are exemplary and may include various alternatives, equivalents, or derivations thereof including but not limited to the order of execution of the same. The steps of the process of FIG. 2 and any alternative similar processes may be embodied in hardware or software including a computer-readable storage medium including instructions executable by the likes of a processor in a computing device. The exemplary process illustrated in FIG. 2 may be performed repeatedly during use of a file association service 170.

In step 210, the file association service 170 may receive one or more digital files from the user device 130. The user device 130 may transfer files to the file association service 170 through various manual and automated methods.

In one embodiment, a user may manually select files and initiate transfer of files to the file association service 170 from the user device 130. The user may select one or more files from storage on the user device 130 and may transfer a raw file 140, an rendered file 150, a sidecar file 160, or any combination therein. In a different embodiment, the user device 130 may be configured to automatically transfer files to the file association service 170, such as automatically transferring a generated raw file 140 at the time of creation. The received files on the file association service 170 may be stored in the database 171 of the file association service 170.

In some embodiments, the user may initiate transfer of files at different times and from different user devices 130. For example, a user may upload rendered files 150 (e.g., JPGs) to database 171 through the Internet and then later send the raw files 140 via one or more storage or data transfer devices. Similarly, one set of files may be transferred at the time of creation from a digital camera, and another set of files may be transferred separately at a later time from a laptop. Thus, files associated with the same shoot may be moved at different times using different devices.

In step 220, the file association service 170 may associate files of different types. The file association service 170 may associate raw files 140 with rendered files 150 and sidecar files 160 using metadata included in each file stored in database 171. Metadata for raw files 140, rendered files 150, and sidecar files 160 may include standard metadata fields, such as a filename, or customized metadata fields (e.g. tags embedded in the file by a user), and capture metadata, such as focal length, aperture, exposure time, and ISO. The file association service 170 may compare metadata fields of one or more files and may associate files that contain matching contents in a given metadata field. The file associate service 170 may associate files received at different times and from different user devices 130 each time a new file is received. For example, a raw file 140, and a .jpg rendered file 150 may be received from a digital camera and associated together based on matching filename in metadata. At a later time, a sidecar file 160 may be uploaded from a laptop, and the file association service may associate the sidecar file 160 with the raw file 140 and rendered file 150 based on matching filename metadata.

In some embodiments, the file association service 170 may associate files using image recognition technology. Image recognition technology may compare raw files 140, rendered files 150, and sidecar files 160 through various AI and ML algorithms. Image recognition technology may include one or more techniques to identify patterns and features in common between multiple files, such as deconstructing the data into numeric values that may be analyzed to identify similar repeated pixel color values between files. The image recognition technology may associate files that are identified as having data with at least one pattern or feature in common. The file association service 170 may track results of image recognition association based on user input confirming or rejecting images that have been associated as an output of image recognition. The file association service 170 may retrain and adjust image recognition outputs based on confirmed and rejected images to improve successful file associations.

A user may also manually update file associations created by file association service 170. The user may overwrite associations previously created through automated processing, such as file associations created based on common metadata or image recognition. The user may add or remove a file from the file association of an asset file 174 regardless of matching metadata or image recognition.

In step 230, the file association service 170 may generate raw file previews. Raw files 140 transferred to the file association service 170 in step 210 may be stored in database 171 as file formats that are unable to be displayed in a web browser, such as .raw, .raf, .rw2, .dng, .dcr, .iiq, .tif, .bmp, .x3f, and various other similar raw file formats. The file association service 170 may automatically convert the raw files 140 to a compressed file format for display in a web browser, such as a .jpeg, .png, .gif, .svg, .webp, or other similar formats, and may save the generated file as a preview file 175. The preview file 175 may be stored as a new and separate file from the raw file 140 on database 171, and may be automatically associated with the asset file 174 of the raw file 140.

In step 240, the file association service 170 may receive a request for an asset file 174. The request for an asset file 174 may be initiated via a user device 130 executing a function of management interface 180. The request may include a user selection for an asset file 174 containing multiple files raw files 140, rendered files 150, and sidecar files 160. The request from management interface 180 may be processed by the file association service 170 to retrieve the requested files from the database 171.

In one embodiment, a user input to the user device 130 may request to create a gallery of files via management interface 180 to display on a website. The management interface 180 may display one or more asset files 174 for inclusion in the gallery of files based on a selection made by the user. The management interface 180 may include commands to filter which file formats are included in a gallery, such as selecting file formats like .jpeg, .png, or .webp files. For example, a user may select to display only .jpeg types of files for a gallery. The management interface 180 may include .jpeg rendered files, but exclude other types of files included in the asset files 174 from the gallery, such as .png rendered files associated with the same asset file 174. The management interface 180 may also send a request to the file association service 170 to generate a preview file 175 in .jpeg format for asset files 174 containing raw files 140 that do not also contain an associated rendered file 150.

In a different embodiment, a user input to the user device 130 may execute a search function of management interface 180 to filter and locate asset files 174. The search function may display a search query including a text box. The user may enter search terms in the text box via the user device 130 related to a variety of search criteria for locating asset files 174. The search criteria may include metadata from asset files 174, raw files 140, rendered files 150, or sidecar files 160, such as the file name, date, geolocation, time of day, imaging parameters, or custom tags. The search terms may further include search criteria for image recognition using artificial intelligence (AI) or machine learning (ML) technology, such as terms relating to the contents of a displayed image which may be absent from metadata. Learning models may therefore be developed for image recognition and characterization based on such metadata. Such learning models may further be updated based on user feedback, so that subsequent images are more likely to be recognized and characterized in accordance with the updated learning models. Thus, image recognition may improve over time as user feedback continues to update the learning models. The learning models may also be used to improve image search functions, which may provide the user device 130 with suggested filters and/or search criteria. Such suggestions may be presented by displaying toggles for enabling or disabling certain categories (e.g., toggles for geolocation-based criteria, image recognition-based searches). Learning models may also be developed and refined for file management workflows for a specific user. Such learning models may be used to predict subsequent steps and parameters thereof (e.g., transfer to and launch of photo editing application, upload to photo sharing application), and such predictions may be used to automatically filter, launch, and/or automate certain workflow steps.

In step 250, the management interface 180 may display the requested files on the display 131 of the user device 130. The display 131 may include the requested asset file 174, raw files 140, rendered files 150, sidecar files 160, associated metadata of the asset file 174, or any combination therein, based on a type of request. For example, a user may request to view a particular .jpeg rendered file 150 that is associated with a raw file 140, and a sidecar file 160. The management interface 180 may generate a display on the user device 130 of the .jpeg rendered file 150 and may excluding displaying the raw file 140 or sidecar file 160. In a different example, the user may request to view the entire asset file 174 containing the raw file 140, the rendered file 150, and the sidecar file 160. The management interface 180 may generate a display including the raw file 140, rendered file 150, and sidecar file 160, and metadata for the asset file 174, such as the filename, image parameters, and date created.

Figure 3:
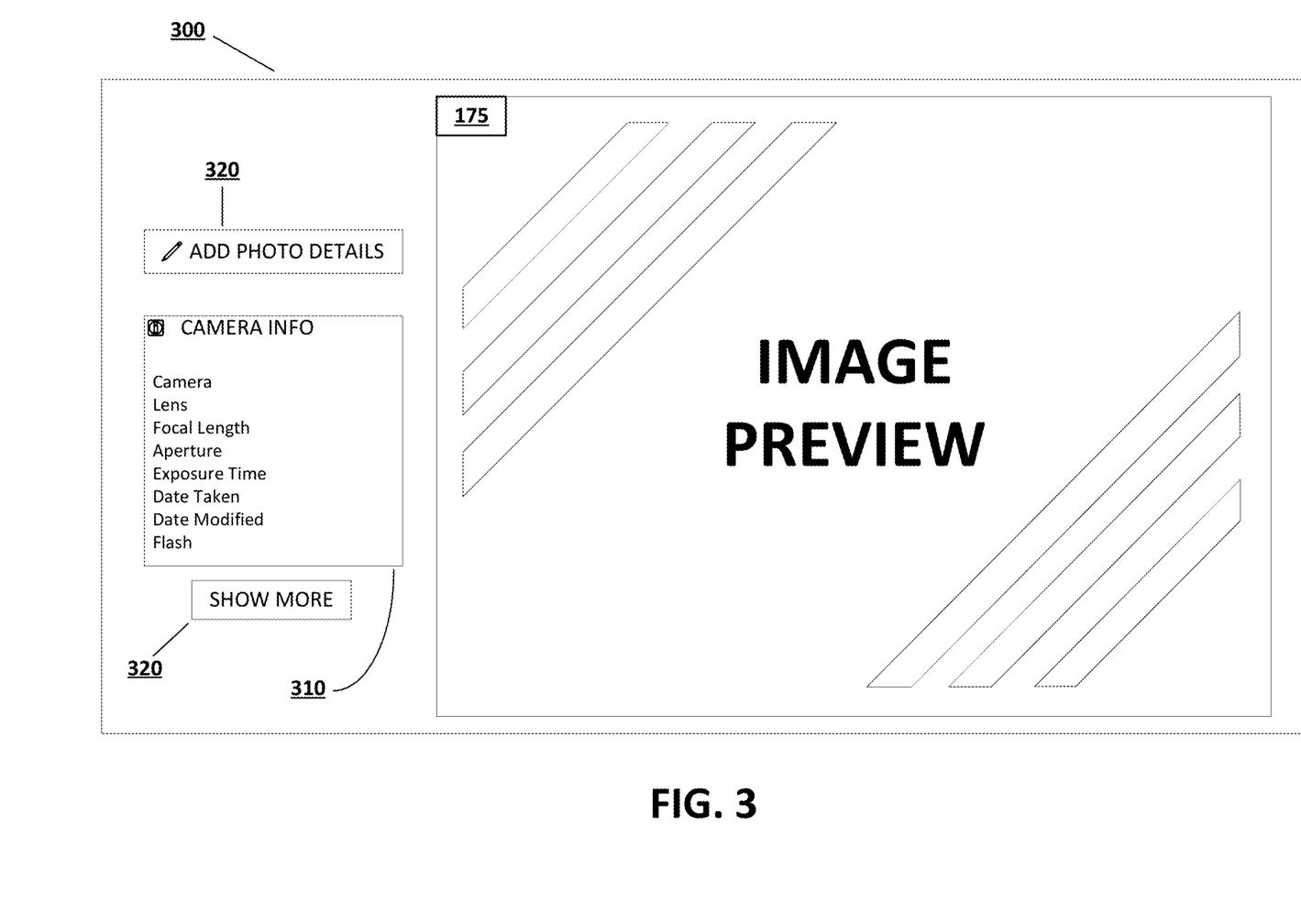
FIG. 3 is an exemplary screenshot of a display generated by the management interface.

FIG. 3 is an exemplary screenshot of a display of the management interface that displays a raw file and information about the metadata. A user may access the raw file 140 from the management interface 180 to view a display 300 of the associated raw file 140. The display 300 of the associated raw file 140 may include the preview file 175 and information about the metadata 310 of the raw file 140, such as camera information and imaging parameters. The file association service 170 may automatically generate a preview file 175 for a received raw file 140 without receiving other files associated with the raw file 140. The management interface 180 may generate commands 320 to add, edit, and view additional metadata of the raw file 140, such as adding tags, captions, notes, or comments. Metadata that has been added or edited by the user may be saved as part of the asset file 174 for the raw file 140 and may be stored in the database 171 of the file association service 170.

Figure 4:
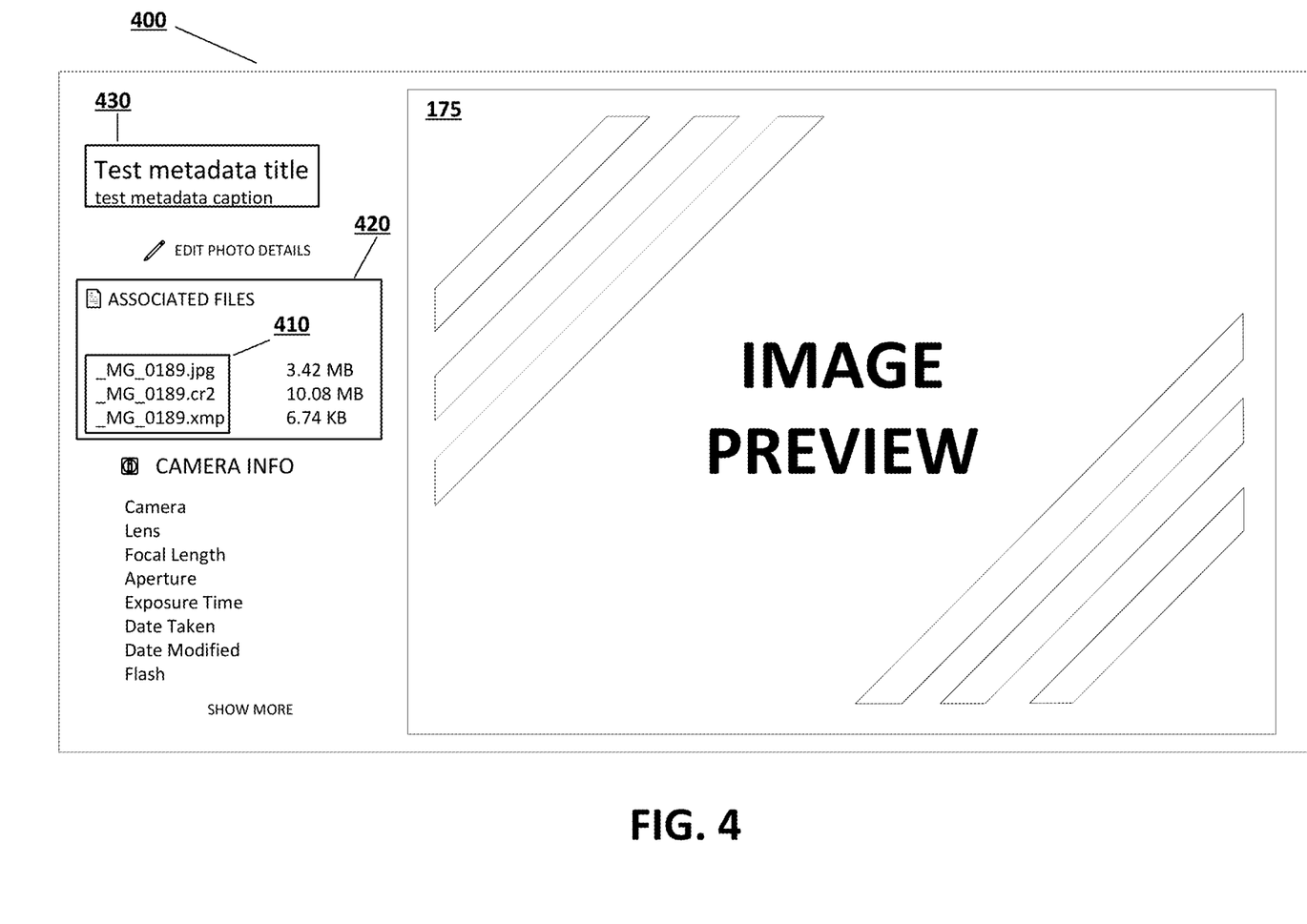
FIG. 4 is an exemplary screenshot of a display generated by the management interface.

FIG. 4 is an exemplary screenshot of a display generated by the management interface displaying associated files of an asset file on the file association service. The file association service 170 may automatically generate an asset file 174 containing associated files based on matching metadata in one or more received files, such a same filename 410. A user may access the asset file 174 from the management interface 180 to view the display 400 displaying the asset file 174, which includes various asset file metadata and details of files associated with the asset file 174.

The details displayed for the asset file 174 and associated files may include a display of a rendered version of the raw file 140 rendered by the file association service 170, such as a preview file 175, or rendered by the user in editing software, such as a rendered file 150 generated from a sidecar file 160. The displayed details may further include a filename 410, a file type, a file size, and a last updated date for each associated. In the displayed embodiment, a raw file 140, a rendered file 150, and a sidecar file 160 have been uploaded and automatically associated to an asset file 174 by the file association service 170 based on each file metadata including a matching filename 410. The display of the associated file details 420 may also include an interactable link to access each of the associated files, such as the raw file display in FIG. 3.

The display 400 of the asset file 174 may also include user-editable fields to add or edit asset metadata 430, such as adding a title or caption. In some embodiments, asset metadata 430 may be saved and stored in the database 171 for the asset file without updating metadata for each associated file. For example, a user may add or edit a title to the asset file metadata 430, while the filenames and title metadata for each associated raw file, rendered file, and sidecar file may remain unchanged.

In a different embodiment, the user may add asset metadata 430 that is automatically propagated to the metadata of each associated file by the file association service 170. The file association service 170 may automatically propagate changes to asset metadata to associated file metadata based on various automated workflow triggers and user preference settings of the file association service 170. Alternatively, the user may manually initiate metadata propagation via a function of the management interface 180. For example, a user may add a custom metadata tag field to the asset metadata 430, such as a "client" to store the name of a customer. In a configuration for the custom tag field, "client," the user may specify a user preference to automatically propagate changes in the custom metadata tag field to each associated file, and the user preference may be stored in the database 171. The user may add text to the asset metadata 430 of an asset file 174 for the "client" tag, such as "client: John Smith." The file association service 170 may automatically propagate the same field and text to each associated file, based on the selected user preference stored in database 171. Additional automated workflow triggers and user preference settings are discussed in further detail in FIG. 5.

Figure 5:
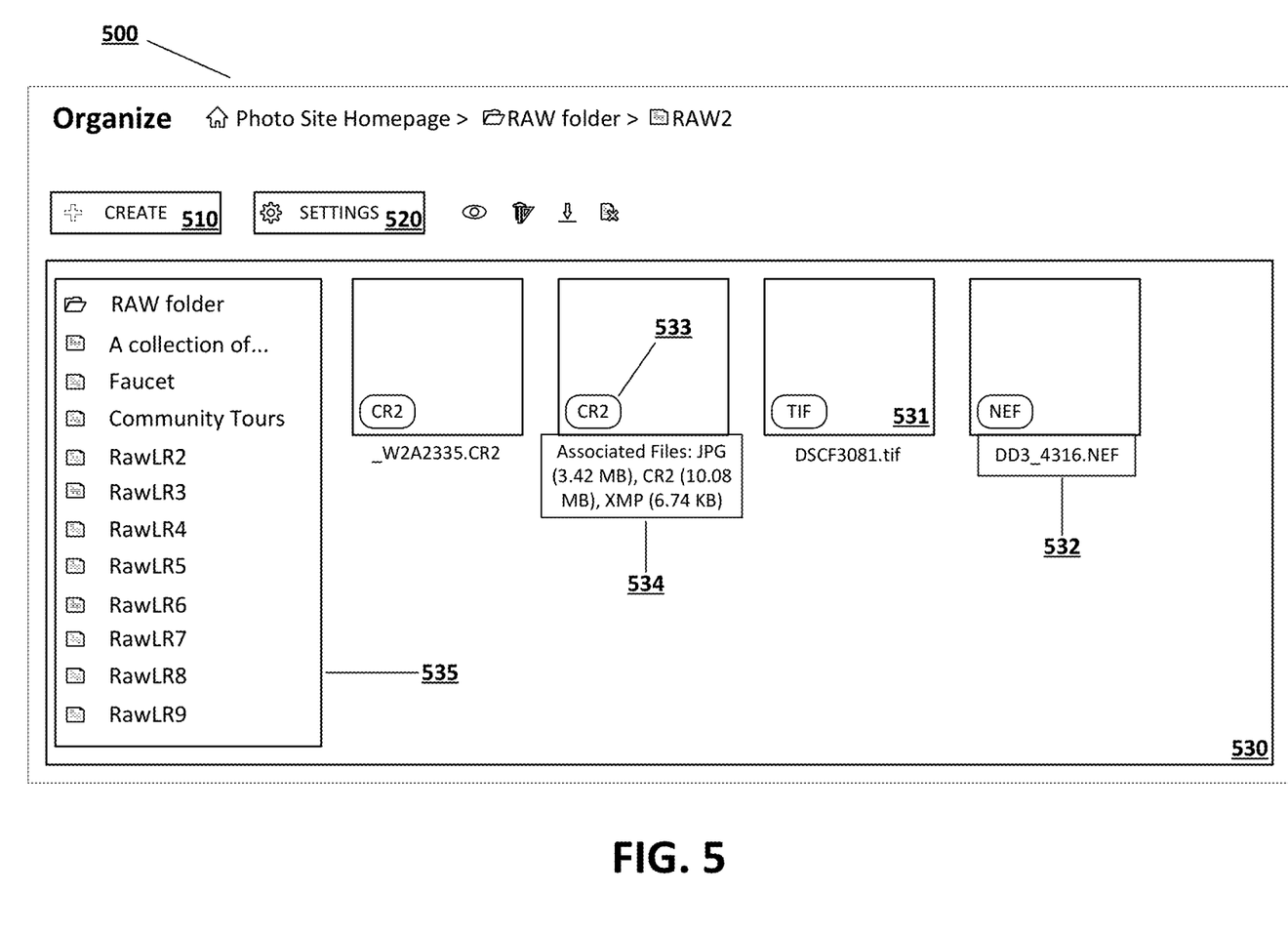
FIG. 5 is an exemplary screenshot of an asset organization view of the management interface.

FIG. 5 is an exemplary screenshot of an asset organization view of the management interface for the file association service. The asset organization view 500 may include various functions related to viewing and interacting with more than one asset file 174 simultaneously. Viewing and interacting with more than one asset file 174 simultaneously may include functions such as an asset assembly 510, user preference settings 520, an asset display table 530, and a variety of other functions.

The asset assembly 510 may include functions for compiling one or more asset files 174 into a group specified by a user. Asset files 174 may be grouped in various ways defined by the user, such as grouping by a capture event or by categories of subjects photographed. The asset assembly 510 may include filters to include or exclude asset files 174 to display for browsing during assembly of a gallery. The asset files 174 may be filtered by the metadata, file types, asset files 174 with or without associated files, and a variety of other similar filters. For example, a user may specify that only files having "dog" metadata be displayed. In another example, the user may specify that all files having "dog" metadata be excluded from the display. The asset assembly 510 may operate in conjunction with the asset display table 530 to display images selected by a user for inclusion in a group.

The user preference settings 520 may include functions for preferred user actions, such as a configuration of automated workflow triggers. Automated workflow triggers may be configured by the user to perform tasks repeatedly and automatically based on the completion of an action by the user or by the completion of an action by the file association service 170.

For example, an automated workflow trigger may be configured by the user to track a history of changes to asset files 174. Changes to asset files 174 may include tracking user actions such as, adding or removing files to the file service 170, updating metadata of files, manually creating file associations, overwriting existing files, and various similar actions. The tracked history of changes to asset files 174 may also include tracking changes automatically made by the file association service 170 in addition to user-initiated changes. The tracked history of changes to asset files 174 may be displayed in the details of each asset file, or as a log of all user actions for a given period of time.

In another example, an automated workflow trigger may be configured by the user to enable secure or permissioned access to asset files 174. Secure or permissioned access to asset files 174 may be enabled in a variety of configurations to limit public access to files, such as restricting access to all newly created files, restricting access to types of files (e.g. disabling viewing asset files 174 that contain only a raw file 140), creating a private uniform resource locator (URL), or requiring a password to access a gallery or file. Secure or permissioned access may be configured uniformly for all files of a user, or may be used in any combination on various subsections of files of a user.

In a different example, an automated workflow trigger may be configured by the user to automatically retrieve files from a user device 130 or other storage location, such as a cloud server. The automated workflow trigger may include a configuration to specify the types of files, location of files (e.g. a specified folder on a user device 130), and frequency to automatically check for and retrieve new files. Based on the configuration, the file association service 170 may periodically check for and retrieve files to be stored in the database 171. Automated retrieval of files may include the file association server 170 communicating with a user device 130 or a cloud server via the API 173.

In yet a different example, an automated workflow trigger may be configured by the user to launch third-party applications 190 from the management interface 180. The automated workflow trigger may include a configuration to select third-party applications 190 from a list of connected third-party applications that the file association service 170 has previously communicated with via the API 173. The automated workflow trigger may further include conditions for launching the selected third-party applications 190, such as launching a storage application when a new file has been created on the file association service, or launching an image editing application for a raw file 140 the user has selected for editing from the management interface 180.

The asset display table 530 may include functions for visually sorting and selecting asset files 174. The asset display table 530 may be used in conjunction with the asset assembly 510 and user preference settings 520, such as when selecting images to create a gallery, or selecting images to launch in an editing application.

The asset display table 530 may display simplified or scaled down versions of various images, metadata, and other information stored in each asset file 174. The asset display table 530 may include a thumbnail image 531 of the asset file 174, a filename 532, and a raw file extension 533. The thumbnail image 531 of the asset file 174 may include a miniature or cropped version of the preview file 175 included in the asset file 174. The management interface 180 may prioritize displaying a preview file 175 for a raw image 140 of the asset file 174 as the thumbnail image 531 instead of displaying any subsequent version or edits of the raw file 140, such as a rendered file 150 included in the asset file 174. In some embodiments, the asset file 174 may not include a raw file 140, and the management interface may display a rendered file 150. The filename 532 may include the filename of the raw file 140, or any other file (e.g. a rendered file 150 or sidecar file 160) in the absence of a raw file 140 within the asset file 174. The raw file extension 533 may display the extension file type of the raw file 140 included in a specific asset file, or may display no extension file type in the absence of a raw file 140 within the asset file 174. The thumbnail image of the asset file 531, filename 532, and raw file extension 533 may be used as simplified information concerning an asset file 174 that assist a user in identifying and selecting files to perform additional functions.

The asset display table 530 may further include interactable functions to display additional information without accessing an individual asset file details. For example, an overlay, such as a hoverover 534, may be displayed during a first user interaction with a displayed asset file 174 in the asset display table 530, such as a user moving a mouse cursor over the name or icon of the asset file 174, or tapping the name or icon the asset file 174 once on a touch-enabled mobile display. The hoverover 534 may include extended metadata information about the asset file 174 in addition the filename 532, such as a list of associated files included in the asset file 174.

Further still, the asset display table 530 may include an asset directory 535, including a file tree consisting of a hierarchy of folders and asset files 174 to assist the user in sorting, browsing, and locating files. Folders of the hierarchy may be manually generated by the user or may be automatically generated by the file association service 170 under certain conditions. For example, the file association service may generate and display a folder containing asset files that have been assembled into a gallery.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for managing raw files, the method comprising:
   evaluating a plurality of image files associated with one or more raw files, wherein each of the image files include respective metadata;
   grouping a set of one or more of the image files together, wherein the set of the image files are grouped together based on matching the respective metadata to a same raw file;
   generating an asset file that associates one or more derivative files to the raw file, wherein the derivative files include one or more file formats that are different from the raw file;
   retrieving the asset file in response to a request from a user device, wherein the request includes a custom asset metadata associated with the asset file;
   automatically propagating the custom asset metadata to the respective metadata of the group of image files;
   selecting at least one of the image files in the grouped set; and
   generating a display of the selected image file for rendering by an interface of the user device based on one or more of the derivative files.

2. The method of claim 1, wherein evaluating the plurality of image files includes comparing the plurality of image files using image recognition technology.

3. The method of claim 2, wherein using the image recognition technology includes identifying common patterns and features of the plurality of image files.

4. The method of claim 1, further comprising formatting one or more image files of the grouped set in a browser.

5. The method of claim 1, wherein selecting the at least one of the image files includes filtering based on a type of files.

6. The method of claim 1, wherein selecting the at least one of the image files includes receiving one or more search queries from the user device.

7. The method of claim 6, wherein the one or more search queries include terms associated with contents of one or more image files in the grouped set.

8. The method of claim 1, wherein selecting the at least one of the image files includes providing the user device with one or more suggested search criteria.

9. The method of claim 1, further comprising refining the selection of at least one of the image files with one or more feedback from the user device.

10. The method of claim 1, further comprising predicting subsequent steps based on the selected image files in the grouped set.

11. The method of claim 1, wherein the derivative files include one or more rendered files, and wherein the rendered files are compressed image files generated from the raw file.

12. The method of claim 1, wherein the derivative files include one or more sidecar files, and wherein the sidecar files include a history of editing process of the raw file.

13. The method of claim 1, further comprising generating a preview file generated from the raw file, and wherein the preview file is included in the generated display of the selected image file.

14. A system for managing raw files, the system comprising:
- a memory; and
- a processor that executes instructions stored in memory, wherein execution of the instructions by the processor:
    - evaluates a plurality of image files associated with one or more raw files, wherein each of the image files include respective metadata;
    - groups a set of one or more of the image files together, wherein the set of the image files are grouped together based on matching the respective metadata to a same raw file;
    - generates an asset file that associates one or more derivative files to the raw file, wherein the derivative files include one or more file formats that are different from the raw file;
    - retrieves the asset file in response to a request from a user device, wherein the request includes a custom asset metadata associated with the asset file;
    - automatically propagates the custom asset metadata to the respective metadata of the group of image files;
    - selects at least one of the image files in the grouped set; and
    - generates a display of the selected image file for rendering by an interface of the user device based on one or more of the derivative files.

15. The system of claim 14, wherein the plurality of image files are evaluated by comparing the plurality of image files using image recognition technology.

16. The system of claim 15, wherein the image recognition technology identifies common patterns and features of the plurality of image files.

17. The system of claim 14, wherein the execution of the instructions by the processor further includes formatting one or more image files of the grouped set in a browser.

18. The system of claim 14, wherein the at least one of the image files are selected by filtering based on a type of files.

19. The system of claim 14, wherein the at least one of the image files are selected by receiving one or more search queries from the user device.

20. The system of claim 19, wherein the one or more search queries include terms associated with contents of one or more image files in the grouped set.

21. The system of claim 14, wherein the at least one of the image files are selected by providing the user device with one or more suggested search criteria.

22. The system of claim 14, wherein the execution of the instructions by the processor further includes refining the selection of at least one of the image files with one or more feedback from the user device.

23. A non-transitory computer-readable storage medium, having embodied thereon a program executable by a processor to perform a method of managing raw files, the method comprising:
- evaluating a plurality of image files associated with one or more raw files, wherein each of the image files include respective metadata;
- grouping a set of one or more of the image files together, wherein the set of the image files are grouped together based on matching the respective metadata to a same raw file;
- generating an asset that associates one or more derivative files to the raw file, wherein the derivative files include one or more file format that are different from the raw file;
- retrieving the asset file in response to a request from a user device, wherein the request includes a custom asset metadata associated with the asset file;
- automatically propagating the custom asset metadata to the respective metadata of the group of image files;
- selecting at least one of the image files in the grouped set; and
- generating a display of the selected image file for rendering by an interface of the user device based on one or more of the derivative files.

* * * * *